United States Patent
Phillips

[15] 3,681,903
[45] Aug. 8, 1972

[54] BLADE STRUCTURE FOR MOWERS AND EDGERS

[72] Inventor: Russell B. Phillips, 334 N.W. Sweetbrier, Roseburg, Oreg. 97470

[22] Filed: April 16, 1971

[21] Appl. No.: 134,761

[52] U.S. Cl. .................................................56/295
[51] Int. Cl. ............................................A01d 55/18
[58] Field of Search...............................56/295, 291

[56] References Cited

UNITED STATES PATENTS

| | | | |
|---|---|---|---|
| 2,859,581 | 11/1958 | Kroll et al. | 56/295 |
| 3,482,380 | 12/1969 | Stair | 56/295 |
| 3,059,400 | 10/1962 | Plummer | 56/295 |
| 3,078,573 | 2/1963 | Kern | 56/295 X |
| 2,071,872 | 2/1937 | Cockburn | 56/295 UX |
| 3,220,170 | 11/1965 | Smith et al. | 56/295 X |

Primary Examiner—Louis G. Mancene
Assistant Examiner—J. N. Eskovitz
Attorney—James D. Givnan, Jr.

[57] ABSTRACT

A disc shaped blade having a plurality of circumferentially located cutting edges each disposed along a radial of the blade. Multiple blade projections extend horizontally outward from the central blade area. Each projection has an integral fin portion extending upwardly and diagonally across the blade projection to impart a desired discharge direction to grass clippings and the like.

1 Claim, 6 Drawing Figures

PATENTED AUG 8 1972 3,681,903
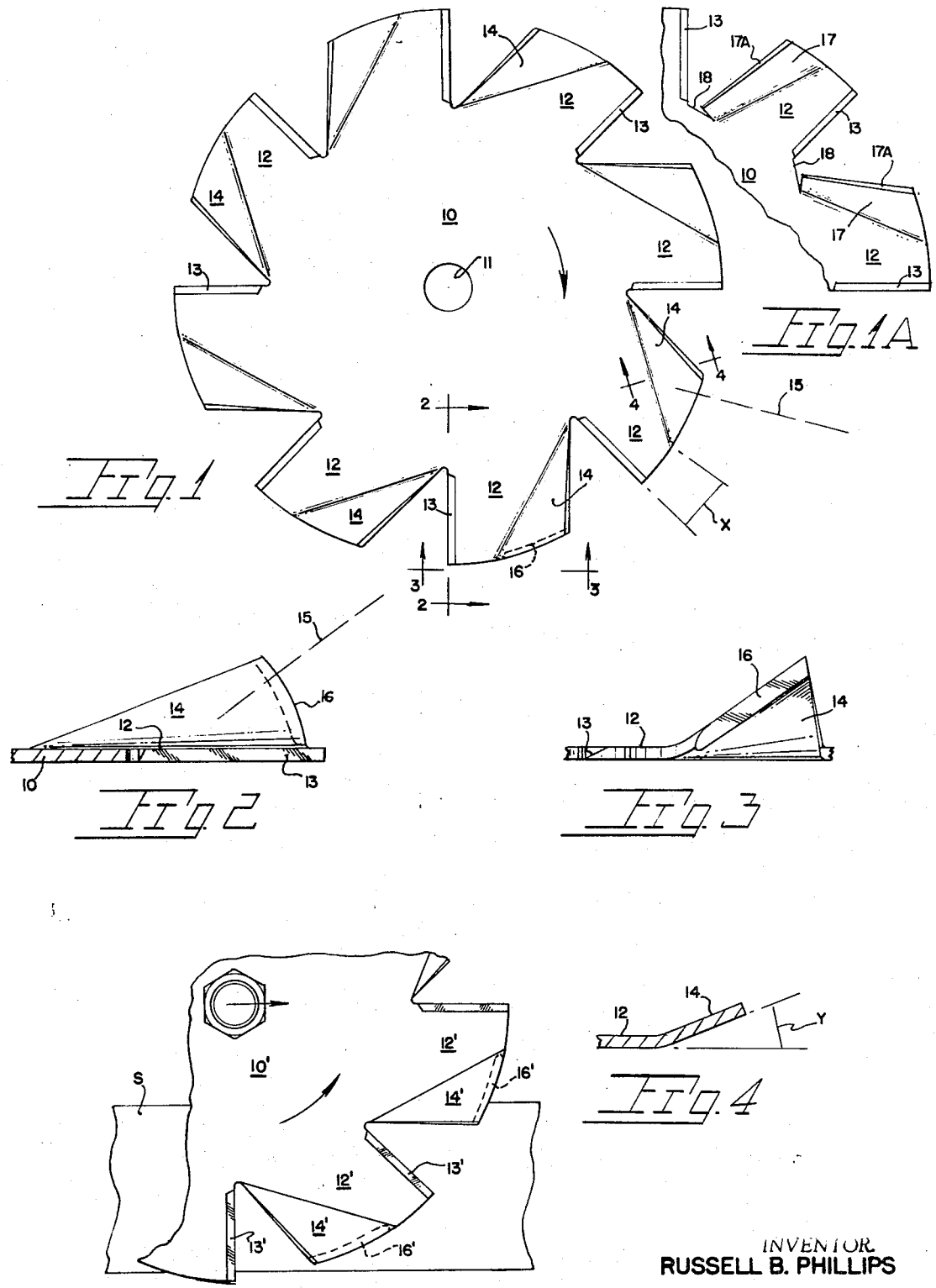
INVENTOR
RUSSELL B. PHILLIPS
BY
AGENT

BLADE STRUCTURE FOR MOWERS AND EDGERS

BACKGROUND OF THE INVENTION

The present invention relates to powered rotary blades for use with powered lawnmowers and edgers. The present blade is formed from a disc and embodies upturned fin portions for desired effects on the matter being dealt with.

Presently used with powered mowers of the rotary type are blade elements of bar configuration with the pair of leading edges of the bar having beveled cutting edges formed thereon. Such bars are for the most part flat with the pair of cutting edges being forwardly offset and located along the outer blade portions.

Disc shaped cutters, in the prior art relating to powered blades, are used other than for mowing purposes, such as in the U.S. Pat. to R. H. Batton No. 2,833,101, and the U. S. Pat. to P. E. Kern No. 3,078,373 wherein the blades are primarily for use as hedge and lawn edgers. The blade of the present invention while also being of generally disc shape is advantageously usable both for mowing and lawn trimming purposes.

SUMMARY OF THE INVENTION

The present blade is of circular, disc-like configuration having a multitude of cutting edges located on true radials with each cutting surface formed on a rearwardly offset blade projection. Each blade projection additionally has an upturned fin portion to exert a desired vacuum effect on the material being cut. Such effects include the outward discharging of cut material as opposed to upward discharge of same and the prepositioning of the material prior to cutting. More specifically, the upturned portions of the blade function to provide a moving turbulent area immediately behind each of said portions to elevate the grass blades prior to passage of the following cutting surface.

The present blade, when used as a blade in a lawn trimmer, prevents buildup of the cut grass and turf by reason of the upturned blade portions imparting inclined-outward discharge of same.

A further advantage of the present blade as an edger blade is the avoidance of damaging impact of the blade against obstructions particularly in instances wherein the blade is used along concrete sidewalks and driveways. A major uninterrupted central area of the disc, rotates in continuous surfacial contact with the concrete which prevents undesired angulation of the blade into blade damaging contact with the concrete surface. In a like manner scuffing of the turf is prevented by the present blade when used as a lawn mowing blade since only a relatively short cutting edge passes over the turf.

The present blade has as a further object the provision of a rotating, disc-shaped blade which requires sharpening only after a long period of use and a blade less apt to propel rocks and the like in a dangerous manner than conventional bar shaped blades presently in use with rotary mowers. Further, the present blade structure is particularly not susceptible to fracturing as occurs with elongate bar type blades or blades with elongate projections thereon.

BRIEF DESCRIPTION OF THE DRAWING

In the accompanying drawing:

FIG. 1 is a plan view of a disc shaped blade embodying the present invention,

FIG. 1A is a view similar to FIG. 1 showing a form of modified fin configuration, FIG. 2 is a horizontal elevational view of a blade projection taken along line 2—2 of FIG. 1, FIG. 3 is an end elevational view of a blade projection taken along line 3—3 of FIG. 1, FIG. 4 is a sectional view taken along line 4—4 of FIG. 1 showing a section of a fin, and FIG. 5 is a side elevational view of a blade embodying the present invention for use as a lawn trimming blade wherein the blade rotates in a vertical plane.

DESCRIPTION OF THE PREFERRED EMBODIMENTS

With continuing reference to the drawings wherein applied reference numerals identify parts similarly identified in the following specification, the reference numeral 10 indicates the central area of the blade body. The blade is adapted for clockwise rotation and a center aperture at 11 which receives the driven shaft of a supporting piece of equipment. The blade body 10 is planar with a plurality of offset projecting members 12 each having a leading cutting edge 13 located substantially on a true radial plane. In one embodiment of the present invention wherein the blade disc is formed on a nine inch diameter the cutting edges 13 are desirably approximately 1 and ½ inches in length.

Each projection 12 includes an upturned fin portion 14 for imparting a desired direction to the matter being dealt with. Each fin 14 extends upwardly along a diagonally extending line originating approximately ten degrees rearwardly of the cutting edge 13 as at $x$ in FIG. 1 with said line extending inwardly and rearwardly (relative to rotational direction) to a point whereat a following cutting edge 13 commences.

With reference to Figures 2 and 3 specifically, a typical fin 14 is shown inclining upwardly and rearwardly away from the horizontally disposed blade projection 12. A vector at 15, in both FIG. 1 and FIG. 2, indicates the course grass particles follow upon discharge from a fin 14 during blade rotation. The vector represents the resultant of centrifugal force imparted to the grass cuttings combined with the upward motion imparted to the cuttings by the inclined fin 14. The clippings are initially carried in the direction of rotation by the fins until such time as centrifugal force causes them to, in effect, be "slung" upwardly and outwardly along the inclined face of a fin 14. In FIG. 3 an end elevation of a projection discloses an undercut beveled surface 16 formed on the surface of the peripheral portion of the fin. Beveled surface 16 terminates outwardly in a secondary cutting edge particularly useful when the blade is cutting tall grass or other vegetation which tend to wind on the blade.

In FIG. 4 the inclination of the fin 14 is shown to be approximately 22° as measured at $y$. The upturned fin 14 may be formed by upwardly bending a portion of the projecting member 12 with a bend indicated by the shaded area extending diagonally across the projecting member.

In FIG. 1A I show a modified fin at 17 wherein its diagonal or angular relationship to the blade projection 12 is reduced. This is achieved by severing the projection 12 along a line indicated at 18 to permit the entire trailing edge at 17A of the fin to be elevated above the plane of the blade body 10 and projection 12.

The present blade structure may, as aforesaid, be advantageously used in conjunction with a powered lawn edger. Characteristically such edgers carry a blade for rotation in a vertical plane for horizontal travel adjacent a sidewalk or driveway. FIG. 5, taken from that side of the blade opposite a sidewalk or driveway structure at S, shows the blade rotating counterclockwise and traveling to the right. For such applications the blade structure will be as described but reversed in direction to provide cutting edges 13' and fins 14', on blade projections 12', with said edges and fins projecting away from the concrete structure S. A beveled surface 16' functions as in the earlier described blade to sever vegetation pulled into the blade. In this form grass clippings and turf severed by the edges 13' are cast upwardly and outwardly leaving a desired trenched area adjacent the structure S. As an edger blade the blade structure has the advantage of avoiding blade edge impact with the concrete for the reason that at all times during edging operation the solid central area of the blade is in contact with the structure S to prevent blade angulation toward the structure S and resulting edge impact.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

1. A disc shaped blade of circular configuration for mounting on the driven shaft of powered lawn equipment such as lawnmowers and edgers, said disc comprising a central planar area having an uninterrupted surface extending outwardly from the blades center for a major portion of the blades radius, consecutive blade projections extending horizontally outward from said central area with said projections constituting the blades peripheral area, each of the projections having a radially disposed forward cutting edge, a fin portion on each of said blade projections extending rearwardly and upwardly in an inclined manner from the horizontal portion of the blade projection, each of said fin portions lying in an inclined plane diagonal to said projection and rearwardly offset from the cutting edge thereof whereby vegetation cut by the blade is outwardly discharged along a vector upwardly inclined to the blade projection, each of said fin portions terminating outwardly in an undercut beveled surface contiguous with said radially disposed cutting edge and providing a secondary cutting edge supplementing the cutting action of said radially disposed cutting edge while simultaneously preventing entanglement of vegetation about the blade projection.

* * * * *